United States Patent
Ohno et al.

(10) Patent No.: US 8,609,031 B2
(45) Date of Patent: Dec. 17, 2013

(54) HONEYCOMB STRUCTURE, EXHAUST GAS CONVERSION APPARATUS, AND MANUFACTURING METHOD OF THE HONEYCOMB STRUCTURE

(75) Inventors: Kazushige Ohno, Gifu (JP); Masafumi Kunieda, Gifu (JP); Takahiko Ido, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 707 days.

(21) Appl. No.: 12/472,268

(22) Filed: May 26, 2009

(65) Prior Publication Data

US 2009/0291034 A1 Nov. 26, 2009

Related U.S. Application Data

(63) Continuation of application No. PCT/JP2008/059277, filed on May 20, 2008.

(51) Int. Cl.
*B01D 50/00* (2006.01)

(52) U.S. Cl.
USPC .......................................................... 422/180

(58) Field of Classification Search
USPC .................................................. 422/177, 180
See application file for complete search history.

(56) References Cited

U.S. PATENT DOCUMENTS

| | | | |
|---|---|---|---|
| 5,393,587 A | 2/1995 | Machida et al. | |
| 2003/0143370 A1 | 7/2003 | Noguchi et al. | |
| 2004/0037998 A1* | 2/2004 | Noda et al. | 428/116 |
| 2004/0166035 A1* | 8/2004 | Noda et al. | 422/180 |
| 2004/0235659 A1 | 11/2004 | Abe et al. | |
| 2005/0120690 A1 | 6/2005 | Noguchi et al. | |
| 2005/0147791 A1 | 7/2005 | Gulati et al. | |
| 2006/0008396 A1* | 1/2006 | Wursthorn et al. | 422/180 |
| 2006/0292393 A1* | 12/2006 | Kunieda | 428/688 |

FOREIGN PATENT DOCUMENTS

| | | |
|---|---|---|
| DE | 4339447 | 5/1994 |
| EP | 1498179 | 1/2005 |
| GB | 2345737 | 7/2000 |
| JP | 03-104628 | 5/1991 |
| JP | 11-138005 | 5/1999 |
| JP | 2000051710 A * | 2/2000 |
| JP | 2002-121085 | 4/2002 |
| JP | 2003-095768 | 4/2003 |
| JP | 2003-103181 | 4/2003 |
| JP | 2004-202426 | 7/2004 |
| JP | 2004-202427 | 7/2004 |
| JP | 2007-229700 | 9/2007 |

(Continued)

OTHER PUBLICATIONS

Japanese Office Action for corresponding JP Application No. 2009-113807, May 28, 2013.

*Primary Examiner* — Tom Duong
(74) *Attorney, Agent, or Firm* — Ditthavong Mori & Steiner, P.C.

(57) ABSTRACT

A honeycomb structure includes at least one honeycomb unit including zeolite, an inorganic binder, and cell walls. The cell walls extend from a first end face to a second end face to define cells along a longitudinal direction of the at least one honeycomb unit. Each of the cell walls includes a center part in the longitudinal direction and a first end part adjacent to the first end face. The first end part has a thickness larger than a thickness of the center part, and/or the first end part has a porosity smaller than a porosity of the center part.

55 Claims, 3 Drawing Sheets

(56) References Cited

FOREIGN PATENT DOCUMENTS

| | | |
|---|---|---|
| JP | 2007-296514 | 11/2007 |
| WO | WO 99/27612 | 6/1999 |
| WO | WO 02/32545 | 4/2002 |
| WO | WO 2006/137149 | 12/2006 |

* cited by examiner

HONEYCOMB STRUCTURE, EXHAUST GAS CONVERSION APPARATUS, AND MANUFACTURING METHOD OF THE HONEYCOMB STRUCTURE

CROSS-REFERENCE TO RELATED APPLICATIONS

The present application is a continuation application of PCT Application PCT/JP2008/059277 filed May 20, 2008, the entire contents of which are incorporated herein by reference.

BACKGROUND OF THE INVENTION

1. Field of the Invention

The present invention generally relates to honeycomb structures, exhaust gas conversion apparatuses, and manufacturing method of the honeycomb structures.

2. Discussion of Background

Although many technologies have been developed in the field of conversion of exhaust gas of automobiles, sufficient measures may not have been taken for the conversion of the exhaust gas due to increasing traffic. Restrictions on the exhaust gas of the automobiles will become further strengthened. Particularly, restriction of NOx in the exhaust gas of diesel engines will become extremely strict. Conventionally, reduction of NOx has been made by controlling the combustion system of an engine. However, recently, this has not been sufficient.

As a NOx conversion system of the diesel engine corresponding to the above-mentioned problems, a NOx deoxidation system (called an "SCR system") where ammonia is used as a deoxidant has been suggested. A honeycomb structure has been known as a catalyst carrier used for such a system.

The honeycomb structure has, for example, plural cells (through holes) extending from one of end surfaces of the honeycomb structure to another end surface in a longitudinal direction of the honeycomb structure. These cells are separated by cell walls where the catalysts are carried. Accordingly, in a case where the exhaust gas is introduced in the above-mentioned honeycomb structure, since NOx contained in the exhaust gas is converted by the catalyst carried on the cell walls, the exhaust gas can be treated.

It is normal practice that the cell walls of such a honeycomb structure are formed of cordierite and, for example, zeolite (formed by ion exchange with iron, copper, or the like) is carried as a catalyst in the cell walls. In addition to this, an example where zeolite is used for the cell walls so that the honeycomb structure is formed has been suggested (see, for example, International Publication No. WO 2006/137149 A1).

The entire contents of International Publication No. WO 2006/137149 A1 are incorporated herein by reference.

SUMMARY OF THE INVENTION

According to one aspect of the present invention, a honeycomb structure includes at least one honeycomb unit including zeolite, an inorganic binder, and cell walls. The cell walls extend from a first end face to a second end face to define cells along a longitudinal direction of the at least one honeycomb unit. Each of the cell walls includes a center part in the longitudinal direction and a first end part adjacent to the first end face. The first end part has a thickness larger than a thickness of the center part, and/or the first end part has a porosity (pore rate) smaller than a porosity of the center part.

According to another aspect of the present invention, an exhaust gas conversion apparatus includes a honeycomb structure, a holding sealing member, and a metal vessel. The honeycomb structure includes at least one honeycomb unit including zeolite, an inorganic binder, and cell walls. The cell walls extend from a first end face to a second end face to define cells along a longitudinal direction of the at least one honeycomb unit. Each of the cell walls includes a center part in the longitudinal direction and a first end part adjacent to the first end face. The first end part has a thickness larger than a thickness of the center part, and/or the first end part has a porosity smaller than a porosity of the center part. The holding sealing member holds a peripheral surface of the honeycomb structure. The metal vessel houses the honeycomb structure via the holding sealing member. The first end face of the honeycomb structure in the metal vessel faces an exhaust gas flow-in side of the metal vessel.

According to further aspect of the present invention, a manufacturing method of a honeycomb structure includes extrusion molding a raw material paste that includes primarily inorganic particles including zeolite and inorganic binder to provide a honeycomb unit molded body. The honeycomb unit molded body has cell walls extending from a first end face to a second end face to define cells along a longitudinal direction of the honeycomb unit molded body. Each of the cell walls includes a center part in the longitudinal direction and a first end part adjacent to the first end face. The honeycomb unit molded body is fired to provide a honeycomb unit. The first end part of the honeycomb unit is soaked in a slurry containing a ceramic component. A ceramic component provided to the first end part is solidified, whereby the honeycomb structure is provided in which the first end part has a thickness larger than a thickness of the center part, and/or the first end part has a porosity smaller than a porosity of the center part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Next, exemplary embodiments of the present invention are described with reference to the accompanying drawings.

Figure 1:
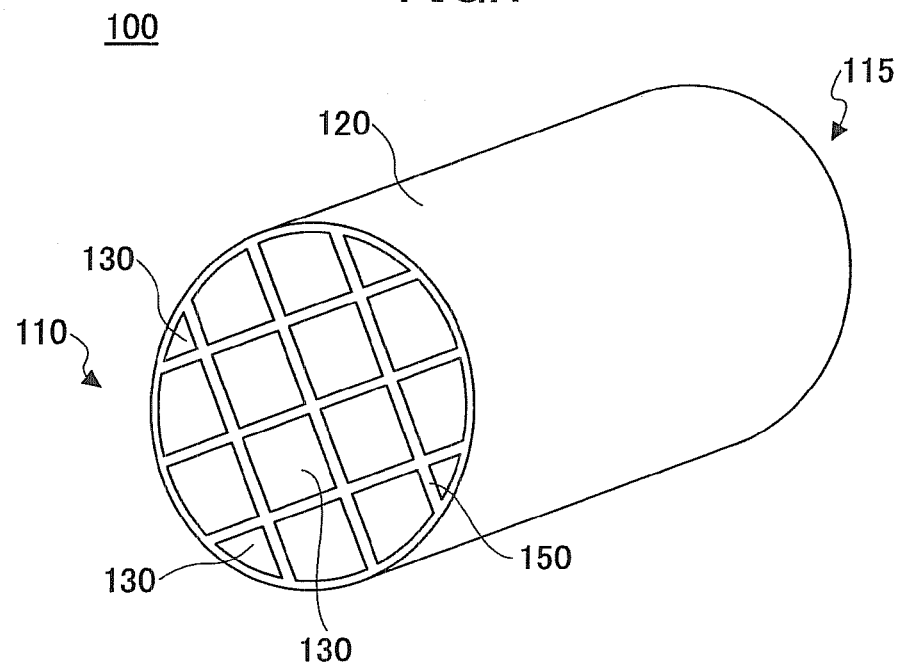
FIG. 1 is a perspective view schematically showing an example of a honeycomb structure of an embodiment of the present invention.

FIG. 1 is a schematic diagram showing a honeycomb structure according to the embodiment of the present invention. Further, FIG. 2 is a schematic diagram showing a honeycomb unit that is the basic unit of the honeycomb structure shown in FIG. 1.

As shown in FIG. 1, a honeycomb structure 100 according to the embodiment of the present invention has two open faces (end faces) 110 and 115. In addition, a coat layer 120 is provided on the peripheral surface of the honeycomb structure 100 except its end faces 110 and 115.

Figure 2:
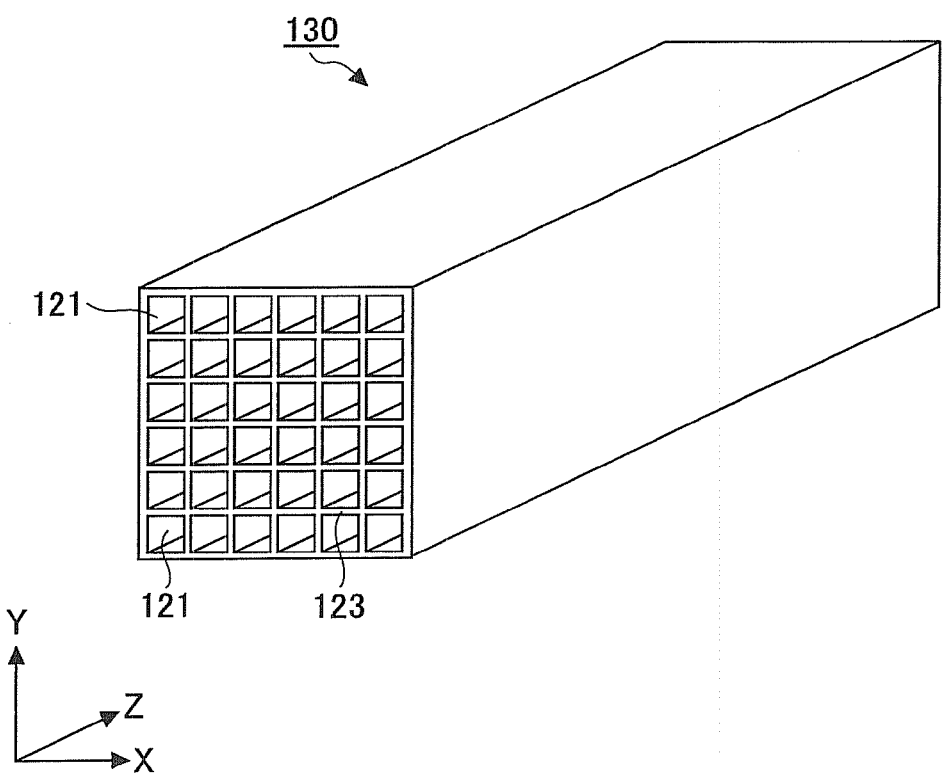
FIG. 2 is a perspective view schematically showing an example of a honeycomb unit constituting the honeycomb structure of FIG. 1.

The honeycomb structure 100 is formed by, for example, joining multiple pillar ceramic honeycomb units 130 shown in FIG. 2 (16 units in a four-by-four matrix in the case of FIG. 1) by interposing an adhesive layer 150 and thereafter cutting the exterior side into a predetermined shape (a cylindrical shape in the case of FIG. 1).

As shown in FIG. 2, the honeycomb unit 130 includes multiple cells (through holes) 121 and cell walls 123. The multiple cells (through holes) 121 extend from one end face to the another end face of the honeycomb unit 130 along its longitudinal directions and have two open end faces. The cell walls 123 separate the cells 121.

The honeycomb unit 130 includes zeolite which contributes to a NOx conversion reaction as an SCR system. Accordingly, in a case where the honeycomb structure of the embodiment of the present invention is used as a catalyst carrier for converting NOx, it is not always necessary to carry a noble metal catalyst on the cell walls. However, the noble metal catalyst may be carried on the cell walls.

The honeycomb structure 100 having the above-discussed structure is, for example, used as a catalyst carrier of a urea SCR system having a urea tank. When exhaust gas is introduced in the urea SCR system, urea in the urea tank reacts with water in the exhaust gas so that ammonia is generated.

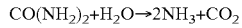

$$CO(NH_2)_2 + H_2O \rightarrow 2NH_3 + CO_2 \quad \text{Formula (1)}$$

When the ammonia flows in the cell from one of the open faces (end faces), for example, the open face 110, with the exhaust gas containing NOx, the following reactions are generated on zeolite contained in the cell wall and in the mixed gas.

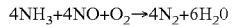

$$4NH_3 + 4NO + O_2 \rightarrow 4N_2 + 6H_2O \quad \text{Formula (2-1)}$$

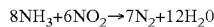

$$8NH_3 + 6NO_2 \rightarrow 7N_2 + 12H_2O \quad \text{Formula (2-2)}$$

$$2NH_3 + NO + NO_2 \rightarrow 2N_2 + 3H_2O \quad \text{Formula (2-3)}$$

After that, converted exhaust gas is discharged from another open face (end face), for example, the open face 115, of the honeycomb structure 100.

Thus, it is possible to treat NOx in the exhaust gas by introducing the exhaust gas into the honeycomb structure 100. Furthermore, although in the example ureic water is hydrolyzed so that $NH_3$ is supplied, $NH_3$ may be supplied by another method.

In a case where a conventional honeycomb structure is used as the catalyst carrier for NOx conversion, due to influence of the exhaust gas having high temperature and high pressure flowing in the honeycomb structure, breakage or damage is often observed at an end face of the exhaust gas flow-in side and the vicinity thereof while the honeycomb structure is used. If such breakage or damage is generated in the honeycomb structure, the amount of catalyst effective for reaction is reduced so that NOx conversion abilities may be degraded. In addition, clogging may be generated in the cells due to scattering foreign materials so that a proper conversion treatment may not be performed.

The embodiments of the present invention is possible to provide a honeycomb structure wherein damage or breakage may not be generated at the end surface side and an exhaust gas conversion apparatus having the honeycomb structure.

On the other hand, in the honeycomb structure 100 of the embodiment of the present invention, an end process is applied to one of end faces of the honeycomb structure 100 (hereinafter a first end face 110) and the vicinity thereof (hereinafter, the first end face 110 and the vicinity thereof, in a body, are called an end face side of an end part 112 of the honeycomb structure).

Here, an end part process is where the end part 112 of the honeycomb structure is covered with a third material or infiltrated by the third material. The end part process includes a process for soaking the end part 112 of the honeycomb structure in slurry so that a slurry component adheres to or infiltrates the end part 112.

In addition, the honeycomb structure where the end part process is applied has at least one of specific features (A) through (C) discussed below. Here, in the following description, in a case where a covering part formed the third material (end part covering material) is provided, the thickness of the cell wall, namely the thickness of the end part, is thickness ("T" in FIG. 3 and FIG. 4) of a sum of the thickness of the cell wall and the thickness of the third material (end part covering material).

(A) The thickness of the cell walls 123 of the end part 112 is greater than the thickness of the cell wall of a part other than the end part (cell walls 123 at a center part in a longitudinal direction of a honeycomb unit).

(B) The thickness of the cell walls 123 of the end part 112 is substantially the same as the thickness of the cell walls 123 of a part other than the end part (cell walls 123 at a center part in a longitudinal direction of a honeycomb unit). A porosity of the cell walls 123 of the end part 112 is less that a porosity of the cell walls 123 of a part other than the end part (cell walls 123 at a center part in a longitudinal direction of a honeycomb unit).

(C) The thickness of the cell walls 123 of the end part 112 is greater than the thickness of the cell walls 123 of a part other than the end part (cell walls 123 at a center part in a longitudinal direction of a honeycomb unit). A porosity of the cell walls 123 of the end part 112 is less than a porosity of the cell walls 123 of a part other than the end part (cell walls 123 at a center part in a longitudinal direction of a honeycomb unit).

For example, in a case where slurry having a low infiltration (high viscosity) is used for the end part 112 of the honeycomb structure, the slurry component stays on the surface of the cell walls 123 and may not infiltrate into pores of the cell walls 123 so as to be solidified. Because of this, the end part 112 may have a tendency described in the above-mentioned feature (A).

Furthermore, for example, in a case where slurry having a high infiltration (low viscosity) is used for the end part 112 of the honeycomb structure, the slurry may easily enter a large number of pores provided in the cell walls 123. Therefore, the thickness of the cell walls 123 may not be changed very much or at all. However, in this case, the pores in the cell walls 123 are filled with the third material so that the porosity of the end part 112 may be decreased compared to the porositys of other parts.

In addition, for example, in a case where the slurry having a medium degree of infiltration is used for the end part 112 of the honeycomb structure, although the slurry infiltrates (enters) into the pores provided in the cell walls 123, the rate of the infiltration (entry) of the slurry is less than that in the case of (B). Accordingly, the slurry component remains on the surface of the cell walls 123 and is solidified.

Accordingly, the thickness of the cell walls 123 of the end part may be greater than that of a part other than the end part (cell walls 123 at a center part in a longitudinal direction of the honeycomb unit); and the porosity of the cell walls 123 of the end part may be less than that of a part other than the end part (cell walls 123 at a center part in a longitudinal direction of the honeycomb unit).

In this case, the thickness of the cell walls 123 may be less than the case of (A) (that is, the thickness of the cell walls 123 of the end part 112 may be greater than the thickness of the cell walls 123 of a part other than the end part (cell walls 123 at a center part in a longitudinal direction of a honeycomb unit).). In addition, the porosity of the cell walls 123 may be less than the case of (B) (that is, the thickness of the cell walls 123 of the end part 112 may be greater than the thickness of the cell walls 123 of a part other than the end part (cell walls 123 at a center part in a longitudinal direction of a honeycomb unit).

When the above-discussed end process is applied to the end part 112 of the honeycomb structure 100, the strength of the end part 112 of the honeycomb structure 100 is improved by at least one of effects of the above-mentioned features (A), (B), and (C). Therefore, in the embodiments of the present invention, it is possible to obtain a honeycomb structure where breakage or damage may not be generated in the end part 112 during the use of the honeycomb structure 100.

For example, in a case of the honeycomb structure with the above-mentioned feature (A), the thickness of the cell wall at the end part 112 is in a range of approximately 0.17 mm through approximately 0.37 mm. In addition, in a case of the honeycomb structure with the above-mentioned feature (B), it is preferable that the porosity of the end part 112 be in a range of approximately 20% through approximately 35%.

For example, in a case of the honeycomb structure with the above-mentioned feature (C), it is preferable that the thickness of the cell walls 123 at the end part 112 be in a range of approximately 0.17 mm through approximately 0.37 mm and the porosity of the end part 112 be in a range of approximately 20% through approximately 35%.

In the following description, the embodiments of the present invention are discussed in detail by using a honeycomb structure as an example where the end part process is applied so that the specific feature (A) is obtained.

Figure 3:
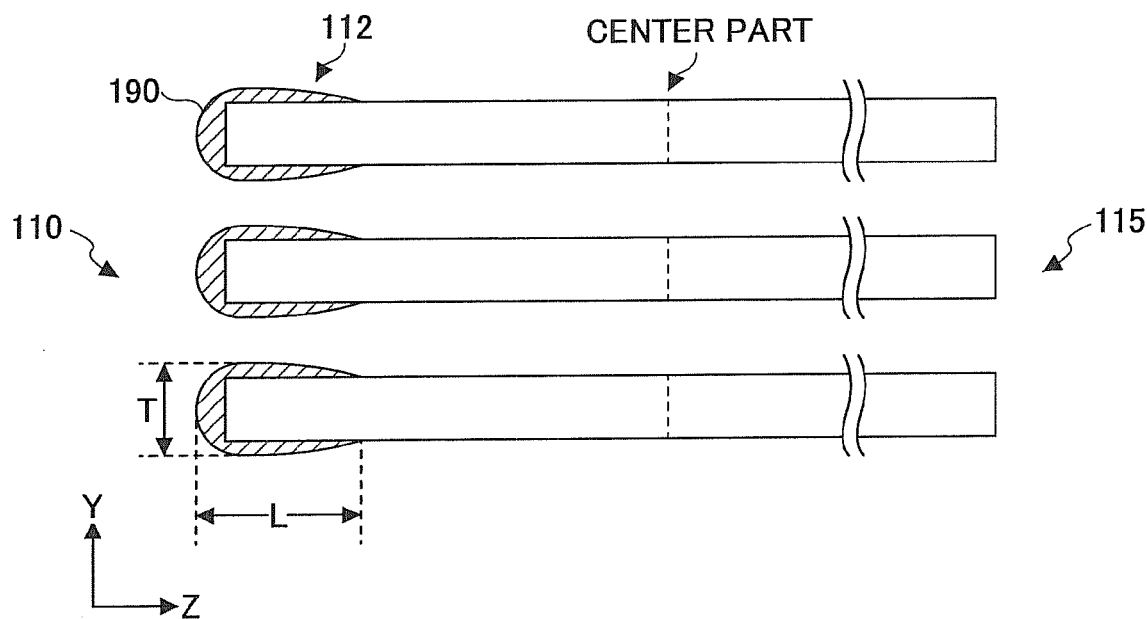
FIG. 3 is a cross-sectional view schematically showing an example of an end part of the honeycomb structure of the embodiment of the present invention.

FIG. 3 is a schematic expanded cross-sectional view of the end parts 112 of the honeycomb structure 100 of the embodiment of the present invention. As illustrated in FIG. 3, the end parts 112 of the honeycomb structure 100 are covered with third materials. The thickness of the cell walls 123 only at parts covered with the third materials is greater that that of other parts. In the following description, parts formed the third material and contributing to increase of the thickness of the cell walls 123 are called end part covering material 190. In the example illustrated in FIG. 3, each of the end part covering materials 190 has even thickness. However, the end part covering material 190 may have a non-uniform thickness.

Although there is no limitation of the position of the center part in the longitudinal direction of the honeycomb unit as long as the position is in the vicinity of the center in the longitudinal direction of the honeycomb unit, the position of the center part in the longitudinal direction of the honeycomb unit generally means in an area within a maximum of approximately 20 mm wherein the center part is a center.

In addition, when the end part covering part is formed so as to have a non-uniform thickness, the thickness of the cell wall of the end part is a most thick part.

In a case where such an end part covering material 190 is provided at the end part 112, since the thickness of the cell walls 123 is increased by the thickness of the end part covering material 190, it is possible to improve the strength of the end part 112 of the honeycomb structure 100.

There is no limitation of the width of an area where the end part covering material 190 is provided, namely the length L in a Z direction of the end part covering material 190. However, it is preferable that the length L be approximately 20 mm at maximum, and more preferable that the length L be equal to or less than approximately 10 mm.

Figure 4:
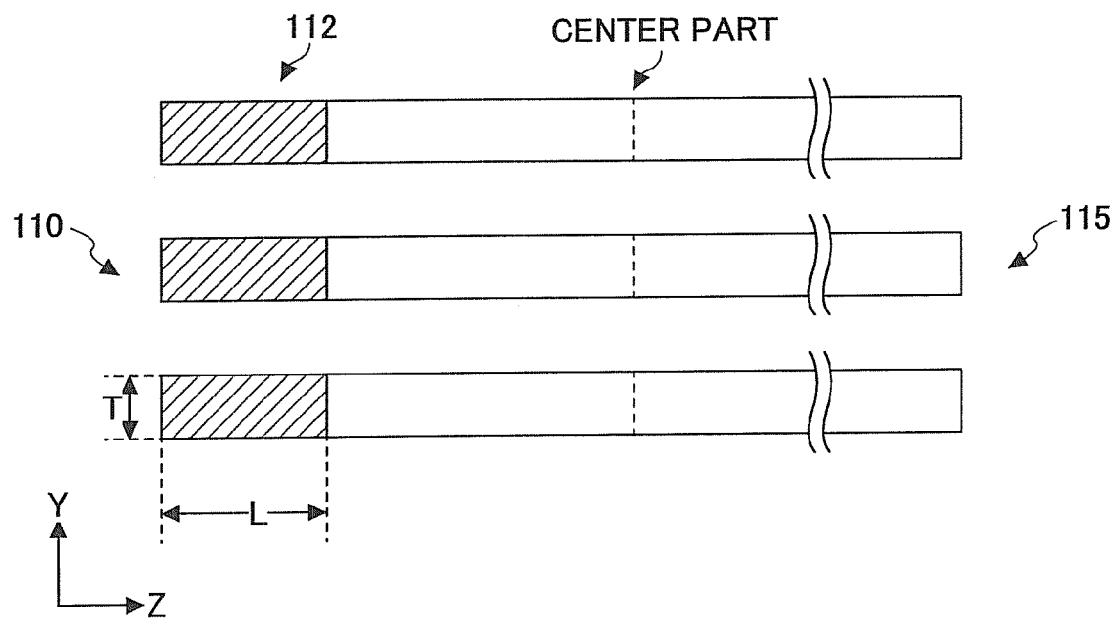
FIG. 4 is a cross-sectional view schematically showing an example of another end part of the honeycomb structure of the embodiment of the present invention.

FIG. 4 is a schematic expanded cross-sectional view of other end parts 112 of the honeycomb structure 100 of the embodiment of the present invention. In FIG. 4 is a honeycomb structure where the end part process is applied so that the specific feature (B) is obtained. In other words, in the example shown in FIG. 4, the thickness of the cell walls 123 of the end part 112 is substantially the same as the thickness of the cell walls 123 of a part other than the end part (cell walls 123 at a center part in a longitudinal direction of a honeycomb unit). A porosity of the cell walls 123 of the end part 112 is less that a porosity of the cell wall of a part other than the end part (cell walls 123 at a center part in a longitudinal direction of a honeycomb unit).

As discussed above, in the honeycomb structure having specific structures illustrated in FIG. 3 and FIG. 4, damage or breakage may not be generated at the end part 112 during the use of the honeycomb structure.

Here, the end part covering material 190 may be a material including any kind of ceramic. For example, the end part covering material 190 may be a material including zeolite, alumina, or zirconia.

For example, in a case where the end part covering material 190 includes zeolite, the end part covering material 190 per self contributes to NOx conversion reaction.

In a case where the end part covering material 190 includes at least one kind of a material among the materials forming the cell walls 123 and discussed below, peeling resistance of the end part covering material 190 can be improved. Especially, in a case where the end part covering material 190 is formed a material having a material composition substantially the same as that of the cell walls 123, thermal expansion of the end part covering part 190 and the cell walls 123 is coordinated so that peeling resistance of the end part covering material 190 can be further improved.

In a case where the end part covering material 190 includes zeolite, the zeolite may be β-type zeolite, Y-type zeolite, ferrierite, ZSM-5 zeolite, mordenite, faujasite, zeolite A, or zeolite L. Zeolite may be made to undergo an ion exchange with Fe, Cu, Ni, Co, Zn, Mn, Ti, Ag or V.

Although examples where the end part covering material is provided only to the end part of one of the end faces of the honeycomb structure in the examples shown in FIG. 3 and FIG. 4, the end part covering material may be provided on the end part of another end face.

In the embodiment of the present invention, the honeycomb unit 130 includes inorganic binder in addition to zeolite. Furthermore, in order to improve the strength, the honeycomb unit 130 may include inorganic particles other than zeolite and/or inorganic fibers.

Zeolite may take any structure, for example, β-type, Y-type, ferrierite, ZSM-5, mordenite, faujasite, zeolite A, or zeolite L. Ion exchange of zeolite may be performed with Fe, Cu, Ni, Co, Zn, Mn, Ti, Ag or V. In addition, it is preferable that the zeolite weight ratio of silica of to alumina be in a range of approximately 30 through approximately 50.

For the inorganic binder, inorganic sol, clay based binder, or the like may be used. Specific examples of the inorganic sol are alumina sol, silica sol, titania sol and liquid glass. Specific examples of the clay based binder are white earth, kaolin, montmorillonite, sepiolite and attapulgite. One kind selected from these inorganic binders may be used alone, or two or more kinds may be used together.

Among the above-mentioned inorganic materials of the inorganic binder, it is preferable to use at least one selected from the group consisting of alumina sol, silica sol, titania sol, liquid glass, sepiolite and attapulgite.

As the inorganic particles other than zeolite, alumina, silica, zirconia, titania, ceria, mullite, and the like are preferable. Precursors of these particles may be used. One kind selected from these particles may be used alone as the inorganic particles, or two or more kinds may be used together. Among them, alumina and zirconia are more preferable.

In a case when inorganic fibers are added to the honeycomb unit 130, a desirable material of such inorganic fibers is alumina, silica, silicon carbide, silica-alumina, glass, potassium titanate, aluminum borate or the like. One kind selected from them may be used alone, or two or more kinds may be used together. Among them, alumina fibers are preferable. Whiskers are included in the inorganic fibers.

As for the total amount (weight rate of the honeycomb unit) of the inorganic particles (zeolite and inorganic particles other than zeolite) included in the honeycomb unit 130, a lower limit is preferably approximately 30 wt %, more preferably approximately 40 wt %, and further more preferably approximately 50 wt %. On the other hand, an upper limit is preferably approximately 90 wt %, more preferably approximately 80 wt %, and further more preferably approximately 75 wt %. When the total amount of the inorganic particles (zeolite and inorganic particles other than zeolite) is equal to or greater than approximately 30 wt %, the amount of inorganic particles contributing to the NOx conversion may not be relatively reduced. On the other hand, when the total amount of the inorganic particles (zeolite and inorganic particles other than zeolite) is equal to or less than approximately 90 wt %, the strength of the honeycomb unit may not be reduced.

As for the amount of the inorganic binder included in the honeycomb unit, the lower limit is preferably approximately 5 wt % or more as solid content, more preferably approximately 10 wt % or more, and further more preferably approximately 15 wt % or more. On the other hand, the upper limit is preferably approximately 50 wt % or less as solid content, more preferably approximately 40 wt % or less, and further more preferably approximately 35 wt % or less. When the content of the inorganic binder is equal to or greater than approximately 5 wt % as solid content, the strength of the manufactured honeycomb unit may not be reduced. On the other hand, when the content is equal to or less than approximately 50 wt % as solid content, the molding processability of the raw material composition may not be reduced.

In the case when inorganic fibers are included in the honeycomb unit, a lower limit of the total amount of the inorganic fibers is preferably approximately 3 wt %, more preferably approximately 5 wt %, and further more preferably approximately 8 wt %. On the other hand, an upper limit is preferably approximately 50 wt %, more preferably approximately 40 wt %, and further more preferably approximately 30 wt %. In a case where the content of the inorganic fibers is equal to or greater than approximately 3 wt %, the contribution of the inorganic fibers to improving the strength of the honeycomb unit may not be degraded. In a case where the content of the inorganic fibers is equal to or less than approximately 50 wt %, it may not be the case that the amount of inorganic particles contributing to the NOx conversion is relatively reduced.

There is no limitation of the shape of a cross section of the honeycomb unit 130 cut perpendicular to the longitudinal direction. It may take any shape as long as the honeycomb units 130 can be joined by interposing an adhesive layer. The shape of the honeycomb unit 130 cross section may be square, rectangular, hexagonal, fan-shaped or the like.

In addition, the shape of a cross section of the cell 121 cut perpendicular to the longitudinal direction is also not particularly limited. Therefore, the shape is not limited to a square, and may be triangular, polygonal, or the like.

It is preferable that the cell density of the honeycomb unit 130 be in a range of approximately $15.5/cm^2$ through approximately $186/cm^2$ (approximately 100 cpsi through approximately 1200 cpsi). It is more preferable that the cell density of the honeycomb unit 130 be in a range of approximately $46.5/cm^2$ through approximately $170/cm^2$ (approximately 300 cpsi through approximately 1100 cpsi). It is further more preferable that the cell density of the honeycomb unit 130 be in a range of approximately $62/cm^2$ through approximately $155/cm^2$ (approximately 400 cpsi through approximately 1000 cpsi).

The thickness of the cell walls 123 (excluding the end part 112) of the honeycomb unit 130 is not particularly limited, yet a preferable lower limit is approximately 0.15 mm in view of the strength and a preferable upper limit is approximately 0.35 mm in views of the NOx conversion performance.

The honeycomb structure 100 of the embodiment of the present invention may take any shape. For example, besides a cylindrical shape as shown in FIG. 1, the shape of honeycomb structure 100 may be cylindroid, square pillar, polygonal pillar or the like.

As to the adhesive layer 150 of the honeycomb structure 100, its raw material is a paste (an adhesive paste). There is no limitation of the adhesive paste. For example, a mixture of the inorganic particles and the inorganic binder; a mixture of the inorganic binders and the inorganic fibers, or a mixture of the inorganic particles, the inorganic binders, and the inorganic fibers can be used. In addition, an organic binder can be further added.

Materials the same as those forming the honeycomb unit can be used as the inorganic particles, inorganic binders, and the inorganic fibers.

In addition, there is no limitation of organic binders. For example, polyvinyl alcohol, methylcellulose, ethyl cellulose, carboxymethylcellulose, or the like may be used. One kind selected from them may be used alone, or a mixture of two or more kinds may be used instead. Among these organic binders, carboxymethylcellulose is preferable.

It is preferable that the thickness of the adhesive layer 150 be in the range of approximately 0.3 mm through approximately 2.0 mm. If the thickness of the adhesive layer 150 is equal to or greater than approximately 0.3 mm, sufficient joining strength may be obtained. If the thickness of the adhesive layer 150 is equal to or less than approximately 2.0 mm, the pressure loss may not be increased. The number of the honeycomb units to be joined is properly selected depending on the size of the honeycomb structure.

An outer peripheral coat layer 120 of the honeycomb structure 100 is made of a material whose raw material is a paste containing the inorganic particles, the inorganic binders and the inorganic fibers the same as the material forming the honeycomb unit and the organic binders.

The outer peripheral coat layer 120 may be made of a material the same as or different from that of the adhesive layer 150. However, it is preferable that the outer peripheral coat layer 120 be made of a material the same as that of the adhesive layer 150. This is because peeling or cracks may not be generated in the outer peripheral coat layer 120 as well as the adhesive layer 150. If necessary, pore-forming agents such as balloons which are hollow microspheres including oxide based ceramic, spherical acrylic particles, graphite, or the like may be added to the raw material paste. The thickness of the outer peripheral coat layer 120 is preferably approximately 0.1 mm through approximately 2.0 mm.

The above description is given of an example of the honeycomb structure 100 formed by joining plural honeycomb units 130 by interposing the adhesive layers 150, like the one shown in FIG. 1.

Figure 5:
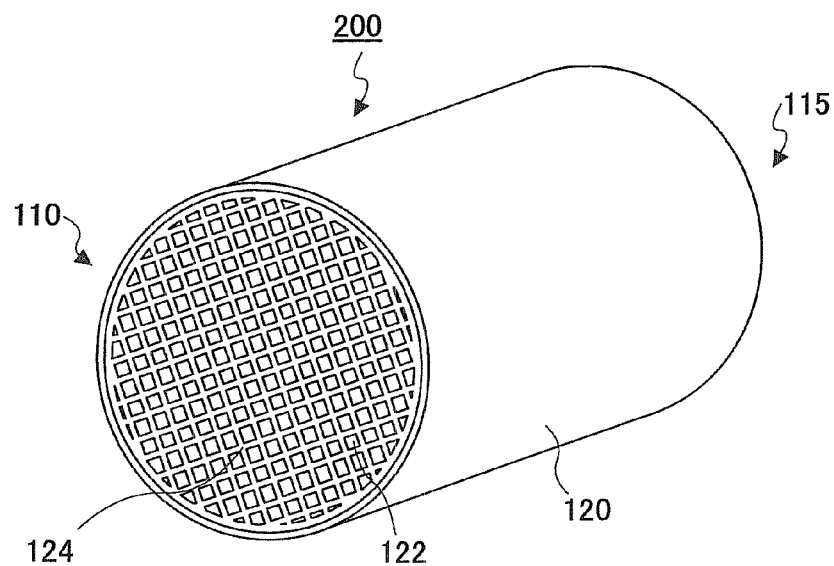
FIG. 5 is a perspective view schematically showing another example of the honeycomb structure of the embodiment of the present invention.

FIG. 5 shows another example of a honeycomb structure of the embodiment of the present invention. A honeycomb structure 200 is the same as the honeycomb structure 100, except that the honeycomb structure 200 is formed of a single honeycomb unit in which plural cells 122 are arranged parallel to each other in the longitudinal direction, separated by cell walls 124. Although the outer peripheral coat layer 120 is formed on the outer peripheral surface of the honeycomb structure 200, the outer peripheral coat layer 120 may or may not be provided on the outer peripheral surface of the honeycomb structure 200.

The honeycomb structure of the embodiment of the present invention can be used for a conversion apparatus of exhaust gas including NOx and the like. Especially, the honeycomb structure of the embodiment of the present invention is proper for an exhaust gas conversion apparatus used for an SCR system (for example, urea SCR system). A structural example of such an exhaust gas conversion apparatus is schematically shown in FIG. 6.

Figure 6:
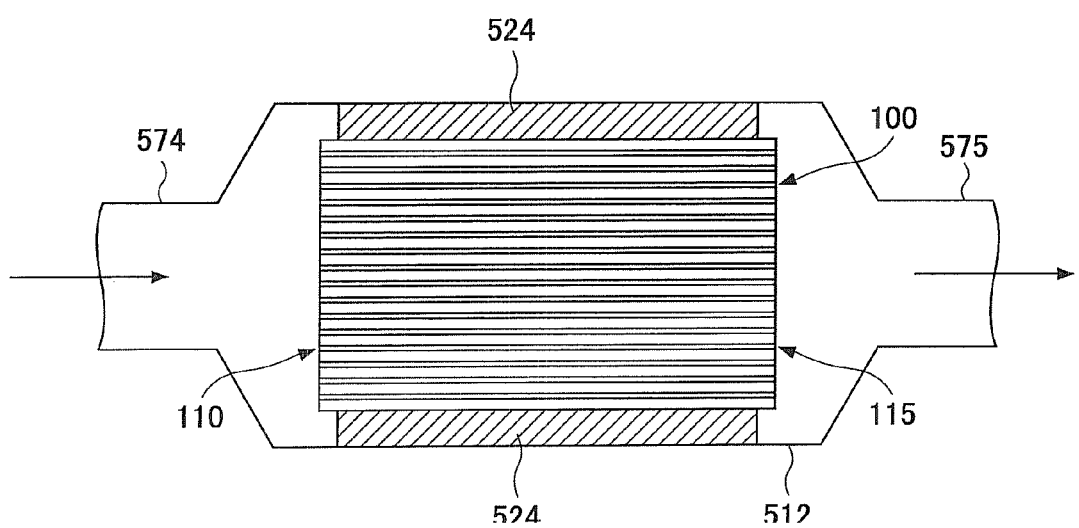
FIG. 6 is a view showing a schematic structural example of an exhaust gas conversion apparatus of the embodiment of having the honeycomb structure of the embodiment of the present invention.

As shown in FIG. 6, an exhaust gas conversion apparatus mainly has the honeycomb structure 100 (or 200), a metal vessel 512 and a holding sealing member 524. The metal vessel 512 receives the honeycomb structure 100. The holding sealing member 524 is provided between the honeycomb structure 100 and the metal vessel 512. The holding sealing member 524 is configured to hold the honeycomb structure 100 in a proper position.

In addition, an introduction pipe 574 is connected to an introduction part of the exhaust gas conversion apparatus 500. The introduction pipe 574 is configured to introduce the exhaust gas exhausted from an internal combustion engine. A discharge tube 575 is connected to a discharge part of the exhaust gas conversion apparatus 500. The discharge tube 575 is configured to discharge the exhaust gas. In FIG. 6, an arrow indicates a flow of the exhaust gas. The honeycomb structure is provided in the exhaust gas conversion apparatus 500 so that the first end face 110 side where the end part process is applied is situated at the introduction side of the exhaust gas.

The exhaust gas discharged from the internal combustion engine such as the engine is introduced in the metal vessel 512 via the introduction pipe 574 so as to flow in each cell 122 from the first end face 110 of the honeycomb structure 100 facing the introduction pipe 574. The exhaust gas flowing in one of the cells 122 passes through the same cell 122 so as to be discharged outside the system.

As discussed above, the end part process is implemented on the end part 112 in the honeycomb structure of the embodiment of the present invention. Accordingly, in such a honeycomb structure, even if the discharge gas having high temperature and high pressure flows in the first end face 110, damage or breakage may be prevented. Because of this, in the exhaust gas conversion apparatus 500 of the embodiment of the present invention, problems such as clogging may not be generated so that stable NOx conversion properties can be maintained for a long time.

Although an example of an exhaust gas conversion apparatus where the end face process is applied at the end part of the first end face of the honeycomb structure (exhaust gas introduction side) is shown in FIG. 6, the end face process may be applied to the end part of the second end face 115 (discharge part side of the discharge gas).

However, it is preferable that the end face process be applied to only one side (end part of the first end face 110) in considering (i) since the exhaust gas having high temperature and high pressure flows in the first end face, the damage or breakage may be generated at the end part of the first end face so that the damage or breakage may not be generated at the end part of the second end face; and (ii) increase of the number of processes or cost.

[Method of Manufacturing Honeycomb Structure]

Next, an example of the method of manufacturing the honeycomb structure of the embodiment of the present invention is discussed. Here, a manufacturing method of the honeycomb structure 100 formed by plural honeycomb units shown in FIG. 1 is discussed as an example.

First, a honeycomb unit molded body is made by, for example, performing extrusion molding using a raw material paste that includes primarily inorganic particles including zeolite and inorganic binder and may also include inorganic fibers which may be added on an as-needed basis.

In addition to these raw materials, organic binders, dispersion media and shaping aids may be added to the raw material paste according to the formability of the raw material paste. The kinds of the organic binders are not particularly limited, and examples of such are one or more kinds of organic binders selected from a group consisting of methylcellulose, carboxymethylcellulose, hydroxyethylcellulose, polyethylene glycol, phenolic resin, epoxy resin and the like. The relative quantity of the organic binders to be blended is preferably approximately 1 to approximately 10 parts by weight when the total of the inorganic particles, inorganic binders and inorganic fibers is 100 parts by weight.

The kinds of the dispersion media are not particularly limited, and examples of such are water, organic solvents (e.g. benzene), and alcohols (e.g. methanol). The kinds of the shaping aids are not particularly limited, and examples of such are ethylene glycols, dextrins, fatty acids, fatty acid soaps and polyalcohols.

The raw material paste is not particularly limited, but is preferably mixed, kneaded and the like. For example, the raw material paste may be mixed using a mixer, attritor or the like, or may be sufficiently kneaded by a kneader or the like. The method of forming and shaping the raw material paste is not particularly limited. However, it is preferable to form a shape having cells by, for example, extrusion molding or the like.

Next, the resultant molded body is preferably dried. A drying apparatus used to dry the molded body is not particularly limited, and examples of such are a microwave drying apparatus, a hot air drying apparatus, a dielectric drying apparatus, a reduced-pressure drying apparatus, a vacuum drying apparatus and a freeze drying apparatus.

Also, the resultant molded body is preferably degreased. Degreasing conditions are not particularly limited and should be appropriately determined according to the kinds and amounts of organic substances included in the molded body; however, the molded body is degreased preferably at approximately 400° C. for approximately two hours.

Furthermore, the resultant molded body is preferably fired. Firing conditions are not particularly limited; however, the molded body is fired preferably at approximately 600° C. through approximately 1200° C., and more preferably at approximately 600° C. through approximately 1000° C. This is because, if the firing temperature is equal to or greater than approximately 600° C., sintering may efficiently progress, which may not lead to a reduction in the strength of the honeycomb unit 130. On the other hand, if the firing temperature is equal to or less than 1200° C., sintering may not excessively progress, so that the reaction sites of the zeolite may not reduced.

Subsequently, an adhesive layer paste to be later formed as an adhesive layer is applied at a uniform thickness on the lateral surface of the honeycomb unit 130 that has been obtained from the previous process. After that, other honeycomb units 130 are sequentially stacked on top of the honeycomb unit 130 by interposing the adhesive layer paste. By repeating this process, a honeycomb structure of a desired size (e.g. honeycomb units 130 arranged in 4 rows and 4 columns) is manufactured.

Next, the honeycomb structure is heated to dry and solidify the adhesive layer paste, whereby the adhesive layers 150 are formed and also the honeycomb units 130 are firmly fixed to each other.

Subsequently, a cutting process is performed on the honeycomb structure 100 to form it into, for example, a cylindrical shape using a diamond cutter or the like, to thereby manufacture the honeycomb structure 100 having a desired peripheral shape.

Then, after an outer peripheral coat layer paste is applied on the peripheral surface (lateral surface) of the honeycomb structure 100, the coat layer paste is dried and solidified to form a coat layer 120.

It is preferable that the honeycomb structure be degreased after the plural honeycomb units 130 are joined by the adhesive layers 150 (this process is performed after the outer peripheral coat layer 120 is provided).

By the degreasing process, in a case where organic binders are included in the adhesive layer paste and coat layer paste, the organic binders can be degreased and removed. Degreasing conditions are appropriately determined according to the kinds and amounts of organic substances included in the adhesive layer paste and the coat layer paste. In a normal case, degreasing is carried out at approximately 700° C. for approximately two hours.

Next, the end part process is performed by using the obtained honeycomb structure. In the end part process, for example, one end part of the honeycomb structure (for example, in an area of approximately 10 mm in the longitudinal direction from the end face) is soaked in the slurry containing a ceramic component for approximately 10 seconds through approximately 100 seconds. As the slurry for the end part process, for example, a material containing at least one kind of the above-mentioned ceramic materials forming the end part covering material 190 as a solidifying component is used.

After that, the honeycomb structure is dried and fired so that the ceramic component is solidified to the honeycomb structure. As a result of this, the honeycomb structure having a configuration illustrated in FIG. 1 where the end part process is applied can be obtained. The honeycomb structure may be manufactured by manufacturing plural honeycomb units having different configurations and joining these honeycomb units.

EXAMPLES

Next, examples of the embodiment of the present invention are discussed in detail.

Example 1

First, 2600 parts by weight of Fe zeolite particles (average particle diameter is 2 μm), 2600 parts by weight of alumina sol (solid contents is 20 wt %), 780 parts by weight of alumina fibers (average fiber length 100 μm, average fiber diameter 6 μm), and 410 parts by weight of methylcellulose were mixed together.

Next, plasticizer and lubricant agent (trademark "Uniroove") were added to the above-mentioned mixture and mixed and so that a mixed composition was obtained.

The Fe zeolite particles were made by ion exchange of 3 wt % of the zeolite weight with Fe. Fe ion exchange was performed by impregnating the zeolite particles in an iron nitride ammonium solution. Concentration of the iron nitride ammonium solution was controlled so that the zeolite contained 3 wt % iron. β zeolite was used as the zeolite. The amount of ion exchange was measured by IPC emission analysis using an apparatus IPCS-8100 manufactured by Shimadzu Corporation.

Next, extrusion molding of this mixed composition was performed by an extrusion molding apparatus so that the honeycomb unit molded body was obtained.

Next, the molded body was sufficiently dried using a microwave drying apparatus and a hot air drying apparatus, and then subjected to a degreasing process at 400° C. for two hours.

After that, the molded body was sintered at 700° C. for two hours so that the honeycomb unit (longitudinal length of 35 mm×horizontal length of 35 mm×full length of 150 mm) was manufactured. The thickness of the cell walls was 0.25 mm; the cell density was 63/cm$^2$ (220 cpsi); and the opening ratio was 65%.

Next, a porosity of the obtained honeycomb unit was measured. A sample for measuring the porosity is made by cutting the honeycomb unit into a cube whose one side is 0.8 cm, ultrasonic cleaning the cube with ion-exchanged water, and then drying the cube.

The porosity was measured for every pressure increment of 0.25 psia (2100.8 Pa) by using an auto porosimeter: Autopore III9405 (manufactured by Shimadzu Corporation). Hereinafter, all of the measurements of the porosity were performed by this method. The porosity was 30%.

Next, the first end part (in an area of approximately 10 mm in a longitudinal direction from the end face) of the obtained honeycomb unit was soaked in slurry for the end part process so that the end part process was performed. The slurry for the end part process includes, as solid contents, 80 wt % of Fe zeolite particles (average particle diameter 2 μm) and 20 wt % of alumina sol (solid contents 20 wt %). The slurry was prepared so that the amount of solid contents was 35 wt % of the entire slurry. Fe zeolite particles are made by ion exchanging 3 wt % of the weight of zeolite by Fe. The end part process was performed for 60 seconds. After that, the honeycomb unit was dried and firing was performed at 700° C. for one hour. Thus, the honeycomb unit where the end part process is applied to the first end part was manufactured.

By this end part process, the cell walls of the first end part of the honeycomb unit had thickness of 0.30 mm and the porosity of 30%.

Example 2

By a method substantially the same as that of the Example 1, the honeycomb unit of the Example 2 where the end process is applied to the first end part is manufactured. In the Example 2, the slurry for the end part process includes, as solid contents, 80 wt % of alumina particles (average particle diameter 2 μm) and 20 wt % of alumina sol (solid contents 20 wt %). The slurry was prepared made so that the amount of solid contents was 35 wt % of the entire slurry.

end part and the thickness and the porosity of the cell walls in another area (an area approximately 10 mm in a longitudinal direction from the center part (approximately 5 mm from the center part) of the honeycomb unit) of the Example 1 through Example 4 and the Comparative Example 1 are shown in the table 1.

TABLE 1

|  | SLURRY FOR END PART PROCESS (COMPOSITION OF SOLID CONTENTS) | FIRST END PART | | OTHER AREA | | RESULT OF CHIPPING TEST |
|---|---|---|---|---|---|---|
|  |  | THICKNESS OF CELL WALL mm | POROSITY % | THICKNESS OF CELL WALL mm | POROSITY % |  |
| EXAMPLE 1 | ZEOLITE PARTICLES (80 wt %) + ALUMINA SOL (20 wt %) | 0.30 | 30 | 0.25 | 30 | ○ |
| EXAMPLE 2 | ALUMINA PARTICLES (80 wt %) + ALUMINA SOL (20 wt %) | 0.30 | 30 | 0.25 | 30 | ○ |
| EXAMPLE 3 | ALUMINA SOL | 0.25 | 25 | 0.25 | 30 | ○ |
| EXAMPLE 4 | ZIRCONIA SOL | 0.25 | 25 | 0.25 | 30 | ○ |
| COMPARISON EXAMPLE 1 | — | 0.25 | 30 | 0.25 | 30 | X |

By this end part process, the cell wall of the first end part of the honeycomb unit had thickness of 0.30 mm and the porosity of 30%.

Example 3

By a method substantially the same as that of the Example 1, the honeycomb unit of the Example 3 where the end process is applied to the first end part was manufactured. In the Example 3, the slurry for the end part process includes, as solid contents, only alumina sol (solid contents 20 wt %). The slurry is prepared so that the amount of solid contents was 35 wt % of the entire slurry.

While the end process does not cause change of thickness of the cell wall of the first end part of the honeycomb unit (0.25 mm), the porosity was decreased so as to be 25%.

Example 4

By a method substantially the same as that of the Example 1, the honeycomb unit of the Example 4 where the end process is applied to the first end part was manufactured. In the Example 4, the slurry for the end part process includes, as solid contents, only zirconia sol (solid contents 20 wt %). The slurry is prepared so that the amount of solid contents was 35 wt % of the entire slurry.

While the end process does not cause change of thickness of the cell walls of the first end part of the honeycomb unit (0.25 mm), the porosity was decreased so as to be 25%.

Comparative Example 1

By a method substantially the same as that of the Example 1, the honeycomb unit of the Comparative Example 1 was manufactured. In this Comparative Example, the end part process was not applied to the honeycomb unit. Accordingly, the thickness and the porosity of the cell wall of the honeycomb unit, regardless of a position, were substantially the same and equal to 0.25 mm and 30%.

Compositions of the slurry for the end part process of the Example 1 through Example 4 and the comparative Example 1 are shown in the following table 1. Furthermore, in the table 1, the thickness and the porosity of the cell walls of the first (Chipping Test)

A chipping test was performed by using the honeycomb units of the Example 1 through Example 4 and the Comparative Example 1 discussed above. In the chipping test, an iron ball was rolled along an inclination path made of a pipe. The iron ball was made to collide with one of the end faces of the honeycomb unit provided at the lowest part of the inclination path. As the iron ball, a carbon steel ball having a diameter of 1.0 cm was used. The weight of the iron ball was 4.1 g. An inclination angle of the inclination path relative to a horizontal direction was 20 degrees. A moving distance of the iron ball along the inclination path was 20 cm.

After the chipping test, it was visually confirmed whether abnormality was generated at the collision end face of the honeycomb unit.

The result of the chipping test of each honeycomb unit is shown at a right end column of the table 1. In this column, "○" indicates a case where breakage was not confirmed as a visual result. "×" indicates a case where breakage was confirmed as a visual result. Through the results of the chipping tests, it is clearly confirmed that the end faces of the honeycomb units of the embodiment of the present invention (Example 1 through Example 4) have higher strength than that of the honeycomb unit of the Comparative Example 1.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that the various changes, substitutions, and alterations could be made hereto without departing from the spirit and scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that the various changes, substitutions, and alterations could be made hereto without departing from the spirit and scope of the invention.

What is claimed is:

1. A honeycomb structure comprising:
   at least one honeycomb unit comprising:
   zeolite;
   an inorganic binder; and
   cell walls extending from a first end face to a second end face to define cells along a longitudinal direction of the at least one honeycomb unit, each of the cell walls including a center part in the longitudinal direction and a first end part adjacent to the first end face, the first end part having a thickness larger than a thickness of the center part, and/or the first end part having a porosity smaller than a porosity of the center part,
   wherein the first end part includes an end part covering material that covers the first end face of the cell walls and extends from the first end face along the longitudinal direction of the at least one honeycomb unit,
   wherein the end part covering material has a non-uniform thickness,
   wherein the end part covering material comprises at least zeolite and alumina or at least zeolite and zirconia, and
   wherein the zeolite included in the end part covering material is obtained through an ion exchange with at least one of Fe, Cu, Ni, Co, Zn, Mn, Ti, Ag and V.

2. The honeycomb structure as claimed in claim 1,
   wherein the thickness of the first end part is from approximately 0.17 mm to approximately 0.37 mm, and
   wherein the thickness of the center part is from approximately 0.15 mm to approximately 0.35 mm.

3. The honeycomb structure as claimed in claim 1,
   wherein the porosity of the first end part is from approximately 20% to approximately 35%, and
   wherein the porosity of the center part is from approximately 25% to approximately 40%.

4. The honeycomb structure as claimed in claim 1,
   wherein the end part covering material has a length equal to or less than approximately 10 mm extending from the first end face and/or the second end face along the longitudinal direction of the at least one honeycomb unit.

5. The honeycomb structure as claimed in claim 1,
   wherein the end part covering material comprises at least one of same materials as contained in the at least one honeycomb unit.

6. The honeycomb structure as claimed in claim 1,
   wherein the zeolite included in the at least one honeycomb unit comprises at least one of β-type zeolite, Y-type zeolite, ferrierite, ZSM-5 zeolite, mordenite, faujasite, zeolite A, and zeolite L.

7. The honeycomb structure as claimed in claim 1,
   wherein the zeolite included in the at least one honeycomb unit is obtained through an ion exchange with at least one of Fe, Cu, Ni, Co, Zn, Mn, Ti, Ag and V.

8. The honeycomb structure as claimed in claim 1,
   wherein the inorganic binder comprises at least one of alumina sol, silica sol, titania sol and liquid glass, sepiolite and attapulgite.

9. The honeycomb structure as claimed in claim 1,
   wherein the at least one honeycomb unit further comprises inorganic fibers.

10. The honeycomb structure as claimed in claim 9,
    wherein the inorganic fibers comprises at least one of alumina, silica, silicon carbide, silica-alumina, glass, potassium titanate, and aluminum borate.

11. The honeycomb structure as claimed in claim 9,
    wherein a total amount of the inorganic fibers included in the at least one honeycomb unit is from approximately 3 wt % to approximately 50 wt %.

12. The honeycomb structure as claimed in claim 1,
    wherein the at least one honeycomb unit comprises plural honeycomb units which are combined together by interposing an adhesive layer to form the honeycomb structure.

13. The honeycomb structure as claimed in claim 12,
    wherein a peripheral portion of the plural honeycomb units is cut into a predetermined shape which defines a peripheral shape of the honeycomb structure.

14. The honeycomb structure as claimed in claim 12,
    wherein the plural honeycomb units include honeycomb units having different configurations.

15. The honeycomb structure as claimed in claim 1,
    wherein the zeolite included in the end part covering material comprises at least one of β-type zeolite, Y-type zeolite, ferrierite, ZSM-5 zeolite, mordenite, faujasite, zeolite A, and zeolite L.

16. The honeycomb structure as claimed in claim 1, further comprising a coat layer provided on a peripheral surface of the honeycomb structure along the longitudinal direction.

17. The honeycomb structure as claimed in claim 1,
    wherein the honeycomb structure is so constructed to be used as a catalyst carrier for converting NOx.

18. The honeycomb structure as claimed in claim 1,
    wherein the honeycomb structure is so constructed to be used as a catalyst carrier of a urea SCR system.

19. The honeycomb structure as claimed in claim 1, further comprising a noble metal catalyst supported by the cell walls.

20. The honeycomb structure as claimed in claim 1,
    wherein the end part covering material has a length of approximately 20 mm at maximum in the longitudinal direction.

21. The honeycomb structure as claimed in claim 1,
    wherein the inorganic binder is one of inorganic sol and clay based binder.

22. The honeycomb structure as claimed in claim 1,
    wherein the at least one honeycomb unit comprises inorganic particles other than zeolite.

23. The honeycomb structure as claimed in claim 22,
    wherein the inorganic particles other than zeolite comprises at least one of alumina, silica, zirconia, titania, ceria, and mullite.

24. The honeycomb structure as claimed in claim 22,
    wherein a total amount of the zeolite and the inorganic particles other than zeolite included in the at least one honeycomb unit is from approximately 30 wt % to approximately 90 wt % of the at least one honeycomb unit.

25. The honeycomb structure as claimed in claim 1,
    wherein an amount of the inorganic binder as solid content included in the at least one honeycomb unit is from approximately 5 wt % to approximately 50 wt %.

26. The honeycomb structure as claimed in claim 1,
    wherein a thickness of the cell walls which is not of the first end part is from approximately 0.15 mm to approximately 0.35 mm.

27. The honeycomb structure as claimed in claim 1,
    wherein the at least one honeycomb unit is a single honeycomb unit forming the honeycomb structure.

28. An exhaust gas conversion apparatus comprising:
a honeycomb structure comprising at least one honeycomb unit, the at least one honeycomb unit comprising:
zeolite;
an inorganic binder; and
cell walls extending from a first end face to a second end face to define cells along a longitudinal direction of the at least one honeycomb unit, each of the cell walls including a center part in the longitudinal direction and a first end part adjacent to the first end face, the first end part having a thickness larger than a thickness of the center part, and/or the first end part having a porosity smaller than a porosity of the center part;
a holding sealing member which holds a peripheral surface of the honeycomb structure; and
a metal vessel which houses the honeycomb structure via the holding sealing member,
wherein the first end face of the honeycomb structure in the metal vessel faces an exhaust gas flow-in side of the metal vessel,
wherein the first end part includes an end part covering material that covers the first end face of the cell walls and extends from the first end face along the longitudinal direction of the at least one honeycomb unit,
wherein the end part covering material has a non-uniform thickness,
wherein the end part covering material comprises at least zeolite and alumina or at least zeolite and zirconia, and
wherein the zeolite included in the end part covering material is obtained through an ion exchange with at least one of Fe, Cu, Ni, Co, Zn, Mn, Ti, Ag and V.

29. The exhaust gas conversion apparatus as claimed in claim 28,
wherein a thickness and a porosity of the second end part are substantially same as the thickness and the porosity of the center part, respectively.

30. The exhaust gas conversion apparatus as claimed in claim 28,
wherein the thickness of the first end part is from approximately 0.17 mm to approximately 0.37 mm, and
wherein the thickness of the center part is from approximately 0.15 mm to approximately 0.35 mm.

31. The exhaust gas conversion apparatus as claimed in claim 28,
wherein the porosity of the first end part is from approximately 20% to approximately 35%, and
wherein the porosity of the center part is from approximately 25% to approximately 40%.

32. The exhaust gas conversion apparatus as claimed in claim 28,
wherein the end part covering material has a length equal to or less than approximately 10 mm extending from the first end face and/or the second end face along the longitudinal direction of the at least one honeycomb unit.

33. The exhaust gas conversion apparatus as claimed in claim 28,
wherein the end part covering material comprises at least one of same materials as contained in the at least one honeycomb unit.

34. The exhaust gas conversion apparatus as claimed in claim 28,
wherein the zeolite included in the at least one honeycomb unit comprises at least one of β-type zeolite, Y-type zeolite, ferrierite, ZSM-5 zeolite, mordenite, faujasite, zeolite A, and zeolite L.

35. The exhaust gas conversion apparatus as claimed in claim 28,
wherein the zeolite included in the at least one honeycomb unit is obtained through an ion exchange with at least one of Fe, Cu, Ni, Co, Zn, Mn, Ti, Ag and V.

36. The exhaust gas conversion apparatus as claimed in claim 28,
wherein the inorganic binder comprises at least one of alumina sol, silica sol, titania sol and liquid glass, sepiolite and attapulgite.

37. The exhaust gas conversion apparatus as claimed in claim 28,
wherein the at least one honeycomb unit further comprises inorganic fibers.

38. The exhaust gas conversion apparatus as claimed in claim 37,
wherein a total amount of the inorganic fibers included in the at least one honeycomb unit is from approximately 3 wt % to approximately 50 wt %.

39. The exhaust gas conversion apparatus as claimed in claim 37,
wherein the inorganic fibers comprises at least one of alumina, silica, silicon carbide, silica-alumina, glass, potassium titanate, and aluminum borate.

40. The exhaust gas conversion apparatus as claimed in claim 28,
wherein the at least one honeycomb unit comprises plural honeycomb units which are combined together by interposing an adhesive layer to form the honeycomb structure.

41. The exhaust gas conversion apparatus as claimed in claim 40,
wherein a peripheral portion of the plural honeycomb units is cut into a predetermined shape which defines the peripheral surface of the honeycomb structure.

42. The exhaust gas conversion apparatus as claimed in claim 40,
wherein the plural honeycomb units include honeycomb units having different configurations.

43. The exhaust gas conversion apparatus as claimed in claim 28,
wherein the zeolite included in the end part covering material comprises at least one of β-type zeolite, Y-type zeolite, ferrierite, ZSM-5 zeolite, mordenite, faujasite, zeolite A, and zeolite L.

44. The exhaust gas conversion apparatus as claimed in claim 28, further comprising a coat layer provided on the peripheral surface of the honeycomb structure along the longitudinal direction.

45. The exhaust gas conversion apparatus as claimed in claim 28,
wherein the honeycomb structure is so constructed to be used as a catalyst carrier for converting NOx.

46. The exhaust gas conversion apparatus as claimed in claim 28,
wherein the honeycomb structure is so constructed to be used as a catalyst carrier of a urea SCR system.

47. The exhaust gas conversion apparatus as claimed in claim 28, further comprising a noble metal catalyst supported by the cell walls.

48. The exhaust gas conversion apparatus as claimed in claim 28,
wherein the end part covering material has a length of approximately 20 mm at maximum in the longitudinal direction.

49. The exhaust gas conversion apparatus as claimed in claim 28,
wherein the inorganic binder is one of inorganic sol and clay based binder.

50. The exhaust gas conversion apparatus as claimed in claim 28,
   wherein the at least one honeycomb unit comprises inorganic particles other than zeolite.

51. The exhaust gas conversion apparatus as claimed in claim 50,
   wherein the inorganic particles other than zeolite comprises at least one of alumina, silica, zirconia, titania, ceria, and mullite.

52. The exhaust gas conversion apparatus as claimed in claim 50,
   wherein a total amount of the zeolite and the inorganic particles other than zeolite included in the at least one honeycomb unit is from approximately 30 wt % to approximately 90 wt % of the at least one honeycomb unit.

53. The exhaust gas conversion apparatus as claimed in claim 28,
   wherein an amount of the inorganic binder as solid content included in the at least one honeycomb unit is from approximately 5 wt % to approximately 50 wt %.

54. The exhaust gas conversion apparatus as claimed in claim 28,
   wherein a thickness of the cell walls which is not of the first or second end part is from approximately 0.15 mm to approximately 0.35 mm.

55. The exhaust gas conversion apparatus as claimed in claim 28,
   wherein the at least one honeycomb unit is a single honeycomb unit forming the honeycomb structure.

* * * * *